United States Patent [19]
Liljengren et al.

[11] Patent Number: 5,158,423
[45] Date of Patent: Oct. 27, 1992

[54] ARRANGEMENT FOR THE TRANSPORTATION OF OBJECTS

[75] Inventors: John-Erik Liljengren; Josef Zitek, both of Olofström, Sweden

[73] Assignee: AB Volvo, Goteborg, Sweden

[21] Appl. No.: 669,411

[22] PCT Filed: Sep. 27, 1989

[86] PCT No.: PCT/SE89/00523

§ 371 Date: Mar. 20, 1991

§ 102(e) Date: Mar. 20, 1991

[87] PCT Pub. No.: WO90/03253

PCT Pub. Date: Apr. 5, 1990

[30] Foreign Application Priority Data

Sep. 28, 1988 [SE] Sweden ................... 8803440

[51] Int. Cl.$^5$ ............................................. B25J 11/00
[52] U.S. Cl. ................................. 414/751; 414/917; 901/21; 901/48; 901/16
[58] Field of Search ............... 414/729, 750-753, 414/733, 917, 738; 901/16, 21, 48

[56] References Cited

U.S. PATENT DOCUMENTS

| | | | |
|---|---|---|---|
| 3,902,606 | 9/1975 | Ronbeck | 414/733 |
| 4,400,984 | 8/1983 | Ronbeck | 414/752 X |
| 4,411,587 | 10/1983 | Niki | 414/752 |
| 4,530,637 | 7/1985 | Mason et al. | 414/750 |
| 4,583,909 | 4/1986 | Yamashita et al. | 414/749 |
| 4,589,819 | 5/1986 | Shirao | 414/752 |
| 4,648,786 | 3/1987 | Sakurai | 414/752 |

FOREIGN PATENT DOCUMENTS

| | | |
|---|---|---|
| 0295215 | 12/1988 | European Pat. Off. . |
| 2483300 | 12/1981 | France ................... 901/48 |
| 452753 | 12/1987 | Sweden . |
| 455682 | 8/1988 | Sweden . |

*Primary Examiner*—Michael S. Huppert
*Assistant Examiner*—William M. Heinz
*Attorney, Agent, or Firm*—Young & Thompson

[57] ABSTRACT

The invention relates to an arrangement for moving objects along a predetermined movement path, comprising a stand, a slide assembly carried by the stand, and a gripping-device attachment device connected to the slide assembly, the gripping device being intended to hold the object being moved by the arrangement. According to the invention an elongated carrier is displaceably mounted on the stand for reciprocating movement along a first straight path. The slide assembly is displaceably mounted on the elongated carrier for reciprocating movement along a second straight path which is substantially perpendicular to the first path. The slide assembly carries one end of a link system, the other end of which is free and reciprocatingly moveable along a third straight path extending perpendicularly to both the first path and the second path. The free end of the link system carries the attachment device.

7 Claims, 3 Drawing Sheets

ARRANGEMENT FOR THE TRANSPORTATION OF OBJECTS

The present invention relates to an arrangement of apparatus intended for transporting objects along a given movement path and comprising a stand structure, a slide assembly carried by the stand structure, and a grippingdevice attachment means connected to the slide assembly, said gripping device being intended to hold the object during its movement along said path.

When pressing sheet-metal components in a press line, for instance sheet-metal components for the automobile industry, various kinds of handling equipment are used for removing the components from a press and inserting said components in the next press in said press line. In this respect, it is important that the components are lifted vertically from the tool of the first press and then transported horizontally and finally deposited, either directly into the tool of the next press or onto a conveyor arrangement, which transports the components to an infeed station located in front of the next press, where a further transport arrangement introduces the components into the press tool. When feeding and removing the sheet-metal components into and from the press tools respectively, it is important that movement of the components relative to the press tool is purely vertical, so that the component will be correctly positioned on the tool and so that the tool will not be damaged by erroneous positioning of the sheet-metal components. Furthermore, the components should be moved into and out of the presses horizontally, since the space in the presses is restricted in the vertical direction.

Modern presses also operate at high speeds, and consequently the arrangement provided for transferring the components between the presses must work equally as quickly, in order to enable the full capacity of the presses to be utilized. The transfer arrangement must therefore work swiftly, in order to cooperate with modern presses.

The object of the present invention is to provide a transfer arrangement which will afford the requisite movement pattern and which is able to operate at high speed and capable of moving at high acceleration, so that each working operation can be carried out in a relatively short time period. This object is achieved in accordance with the invention with an arrangement of the kind described in the introduction and having the characteristic features set forth below.

The inventive apparatus is capable of operating at the high accelerations and speeds required to enable each working operation to be carried out in relatively short time periods, so that the arrangement is able to cooperate with modern presses operating at high capacities.

The invention will now be described in more detail with reference to the accompanying drawings, which illustrate an exemplifying embodiment of the inventive arrangement and in which FIG. 1 is a front view of the arrangement;

Figure 1:
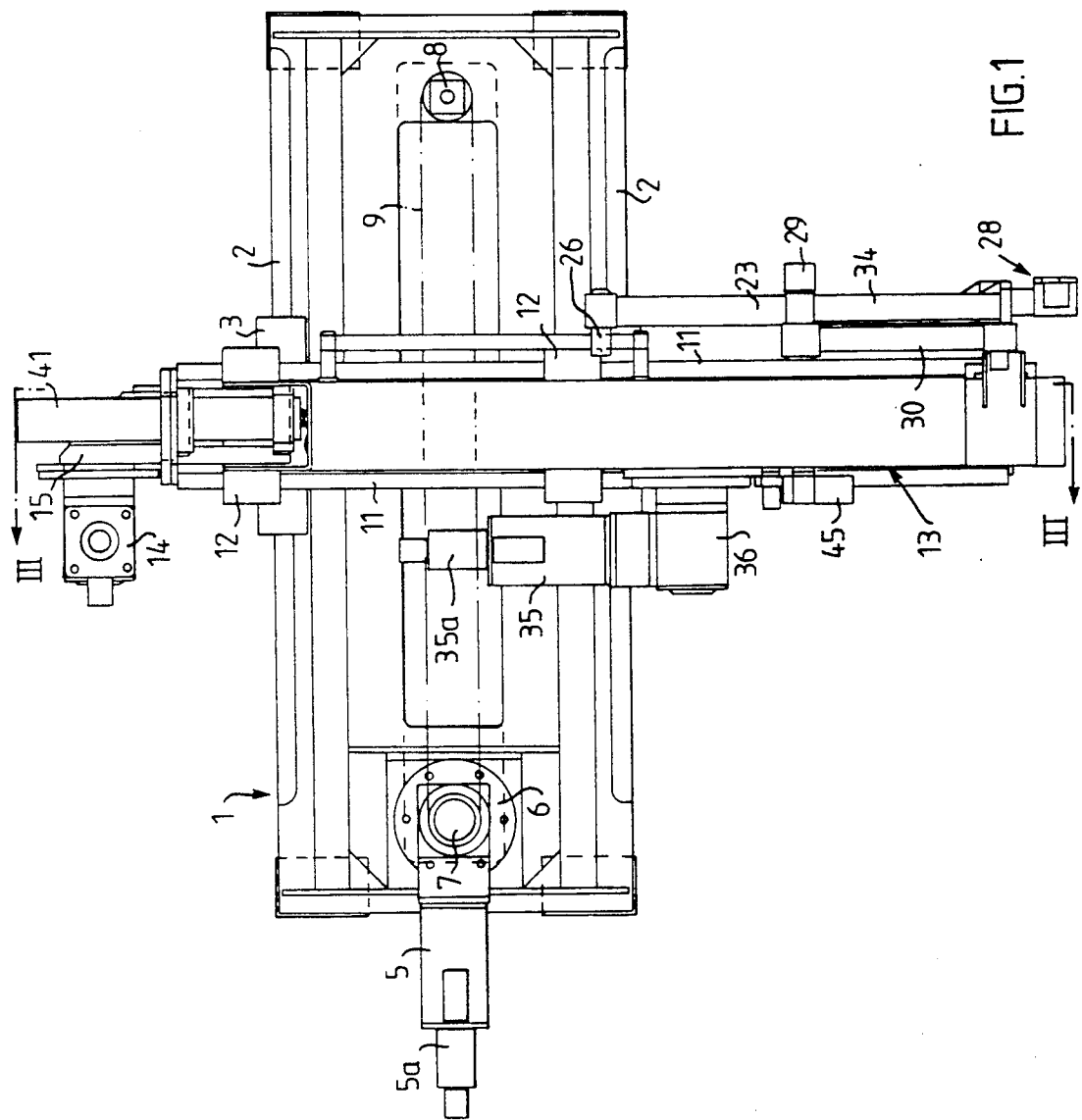
Figure 2:
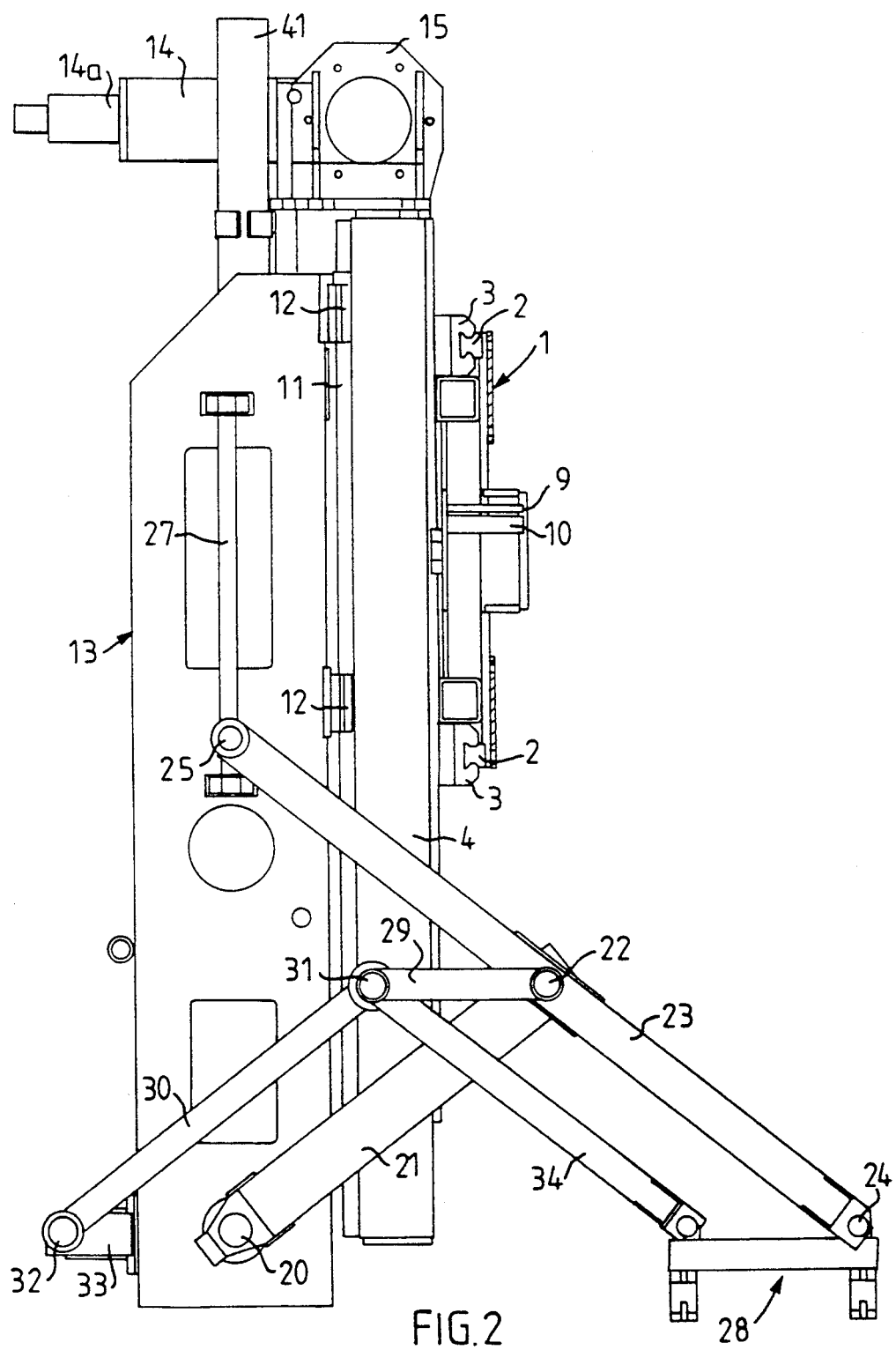
FIG. 2 is a side view of the arrangement illustrated in FIG. 1.

The inventive arrangement illustrated in the drawings includes a stand 1, which in the case of the illustrated embodiment is intended to be mounted, e.g. on a press (not shown in the drawing). The stand 1 is provided with guides 2 or rails which are located vertically one above the other and which extend horizontally along the longitudinal edges of the stand 1.

The inventive arrangement further comprises an elongated carrier 4 on which carriages 3 are mounted for movement along the guides or rails 2, such as to enable the elongated carrier 4 to be moved along the guides 2 on the stand 1, with the aid of the carriages 3. This movement of the elongated carrier 4 is accomplished by means of a drive motor 5 connected to a gear 6, which in turn carries a drive roller 7. A toothed belt 9 extends over the drive roller 7 and over a guide roller or pulley 8 located at the opposite end of the stand 1, said belt 9 being attached to an attachment 10 on the elongated carrier 4.

The elongated carrier 4 is provided with guides 11 which extend perpendicular to the guides 2 on the stand 1, but in a plane parallel with the plane of said guides 2. Running on the guides 11 are carriages 12, which are attached to a slide assembly 13 which is capable of moving rectilinearly along the guides 11 on the elongated carrier 4, with the aid of the carriages 12. This rectilinear movement of the slide assembly is accomplished by a drive motor 14, which is connected to a gear 15 mounted on the elongated carrier 4. The drive motor 14 and the gear 15 drive a drive roller 16. Extending over the drive roller 16 and a guide roller or pulley 17 located at the other end of the elongated carrier 4 is a toothed belt 18, which is attached to the slide assembly 13 by means of an attachment 19.

The slide assembly 13 is provided at its lower end (seen in the drawing) with a transverse shaft 20 which extends parallel to the guides 2 on the stand 1. The shaft projects laterally from the slide assembly 13 and one end of a first link-arm 21 is non-rotatably attached to this projecting part of the shaft 20. The other end of the first link-arm 21 is pivotally connected to the centre of a second link-arm 23, by means of a pivot pin 22. The first end of the link-arm 23, which is a free end, is provided with a pivot pin 24, whereas the other end of said link-arm is provided with a pivot pin 25 for a slide piece 26 journalled for movement along a rod 27. The rod 27 is attached to the slide assembly 13 in a manner such as to extend parallel with the direction of movement of the slide assembly 13, and such that the geometric axis of the rod will intersect the geometric axis of the shaft 20. The length of link-arm 23 located between the pivot pins 24 and 25 is twice as great as the length of the first link-arm 21 between the shaft 20 and the pivot pin 22.

The afore-described construction of the link system comprising the link-arms 21 and 23 functions to impart a rectilinear movement to the first, free end 24 of the second link-arm 23 when the shaft 20 rotates. This rectilinear movement extends along a path which is perpendicular to both the guides 2 of the stand 1 and the guides 11 of the elongated carrier 4.

Mounted at the free end 24 of the second link-arm 23 is a device 28 for the attachment of a gripping device The gripping device is intended to grip and carry objects, e.g. pressed sheetmetal components, for transference of said objects between two predetermined points. In order to ensure that the attachment device 28 and the gripping device secured thereto do not rotate when moved by means of the link-arms 21 and 23, the first link-arm 21 forms part of a parallelogram-link system which, in addition to the first link-arm 21 comprises a link-arm 29 whose one end is connected to the pin 22 and whose other end is connected to one end of a link-arm 30 by means of a pin 31. The other end of the link-arm 30 is connected to an attachment 33 on the slide assembly 13 by means of a pin 32. The part of the second link-arm located between the pin 22 and the free end 24 also forms part of a parallelogram-link system, which also includes the attachment device 28, the link-arm 29 and a link-arm 34 located between the pin 31 and the attachment device 28.

Figure 3:
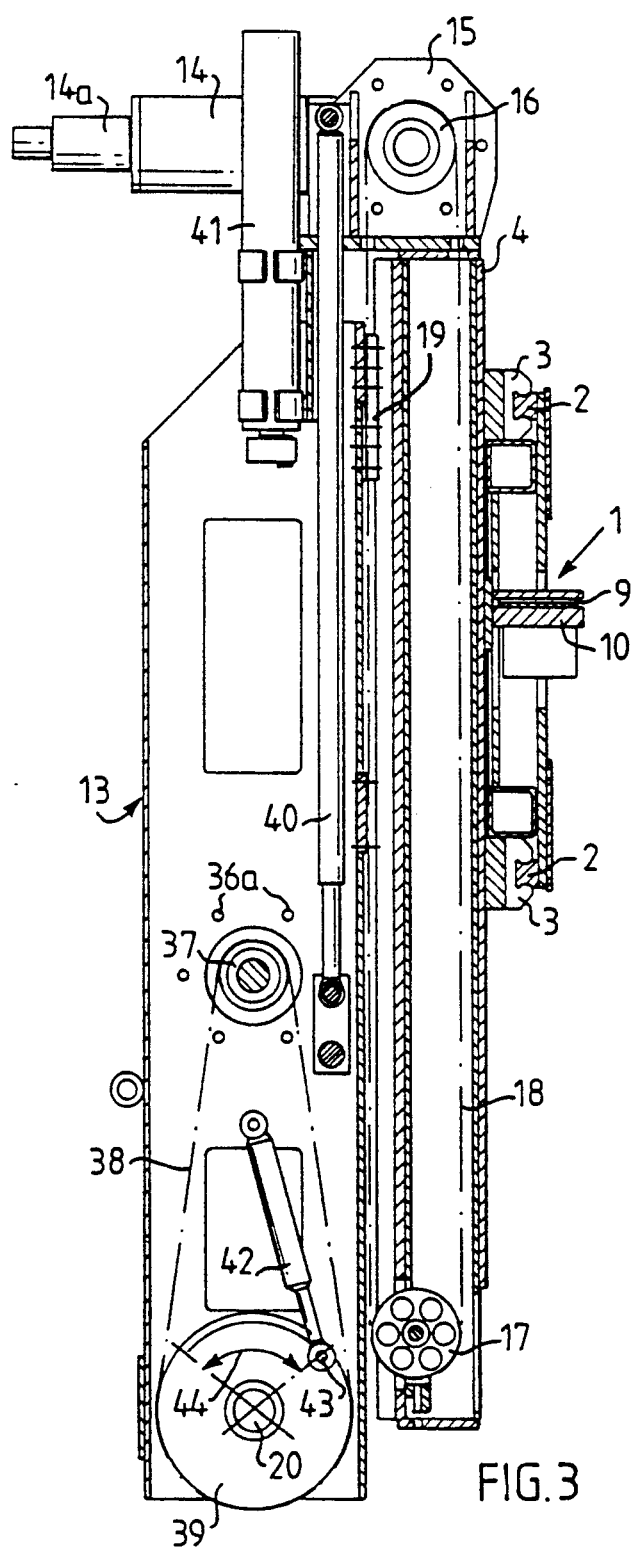
FIG. 3 is a sectional view taken on the line III—III in FIG. 1.

The shaft 20 is rotated by means of a drive motor 35 connected to a gear 36, which is bolted on the slide assembly 13 by means of bolts 36a and which carries a drive roller 37. A toothed belt 38 extends over the drive roller 37 and also over a guide roller or pulley 39 which is attached to the shaft 20. As will be seen from FIG. 3, the guide roller 39 has a much larger diameter than the drive roller 37. Consequently, any play in the gear 36 will be decreased in correspondence with the transmission ratio between the drive roller 37 and the guide roller 39, so that the accuracy of the angular position of the shaft 20 will be increased to a corresponding degree.

One condition for achieving this increase in accuracy is that the toothed belt 38 is tensioned with a force of such magnitude that the belt will remain tight irrespective of the load to which the belt conceivably can be subjected during normal operation. This tensioning of the belt can be effected in various ways, for instance by passing the bolts 36a holding the gear 36 to the slide assembly 13 through elongated holes which enable the gear 36, and therewith also the drive roller 37, to be moved towards and away from the shaft 20 and the guide roller 39.

The mass to be moved when moving the slide assembly along the guides 11 is quite considerable. This mass is comprised of the slide assembly 13, the link system 21-27, 29-34, the attachment device 28, the gripping device and the object (not shown) carried by the gripping device. For the purpose of reducing the forces required to move this mass, the slide assembly 13 is provided with a counterbalance arrangement comprising a gas spring 40 and associated pressure accumulator 41 coupled between the slide assembly 13 and the elongated carrier 4. The pressure accumulator 41 is attached to the elongated carrier 4 and enables a balancing force to be exerted on the slide assembly 13, this balancing force being changed to only a relatively small extent, despite the long length of stroke of the slide assembly 13. By adjusting the pressure in the pressure accumulator 41, it is possible to provide a balancing effect which is adapted to prevailing conditions, for instance for compensating for changes in the weight of the attachment device and the gripping device and the weight of the objects to be transferred. By using the pressure accumulator 41 coupled to the gas spring 40, which means that the counterbalance arrangement will form a closed system, it is possible to utilize a much higher pressure than if the system were connected, for instance, to a compressed-air network. This enables the gas spring to be given smaller dimensions, which in turn means that the mass to be moved will also be smaller.

For the purpose of balancing the torque of the link system 21-27, 29-34 acting on the shaft 20, one end of a gas spring 42 is pivotally connected to the slide assembly 13 and the other end of said gas spring is pivotally connected to a pin 43 on the guide roller 39, in the vicinity of the periphery thereof. As will be seen from FIG. 3, the pin 43 is so arranged that its range of movement 44 will lie symmetrically around a line which connects the first end of the gas spring 42 to the shaft 20. Consequently, the gas spring 42 will offer increased resistance to rotation of the shaft 20 in each direction, from a centre position which corresponds to a centre position of the attachment device 28 when said attachment device does not apply torque to the shaft 20. By using a pressure accumulator 45 whose pressure can be adjusted, the desired balancing force can be obtained with the aid of the gas spring 42, such as to enable the drive motor 35 and the gear 36 to have relatively small dimensions, despite the fact that the attachment device 28 and the gripping device may be loaded with relatively heavy objects. At the same time, the force generated by the gas spring 42 acts on the moveable parts of the drive arrangement in one and the same direction, so as to increase positioning accuracy. The gas spring 42 and the pressure accumulator 45 also form a closed system which enables high pressures to be used, therewith enabling smaller dimensions to be chosen. This also affords the advantage of a smaller mass to be transferred.

The use of a gear 36 having a relatively high transmission ratio and the use of a particular transmission ratio between the drive pulley 37 and the guide pulley 39 enables the drive motor 35 used to be a high-speed motor. This motor will have small dimensions, and thus also a small mass and a low moment of inertia. Consequently, the drive motor 35 is able to accelerate very quickly, which is essential in order to obtain the desired short time periods for effecting movement of the link system 21-27, 29-34. Furthermore, the aforementioned reduction in the play in the gear 36 is also achieved, so as to enhance the accuracy.

The modus operandi of the afore-described arrangement will be apparent from the above description. The arrangement enables the attachment device 28 to be moved along three mutually perpendicular paths. Thus, the attachment device 28 can be moved to any selected points within the working range of the arrangement and an object can be transferred from one point to another point along a predetermined movement path when the three drive motors 5, 14 and 35 are controlled in an appropriate manner. To this end, the drive motors may be provided with pulse emitters 5a, 14a and 35a respectively adapted to transmit information relating to movement of the motors to a programmable control device (not shown) constructed to control the motors in a manner to obtain desired movements. This control device may be constructed in various ways well known to those skilled in this art, and since such a device forms no part of the present invention, it will not be described in detail here.

The invention is not restricted to the afore-described exemplifying embodiment, and modifications can be made within the scope of the following Claims. For example, the inventive arrangement can be used in widely differing fields for holding and moving different objects in accordance with desired movement patterns.

We claim:

1. An arrangement for moving objects along a predetermined movement path, comprising a stand (1), a slide assembly (13) carried by said stand (1), and a gripping-device attachment means (28) connected to the slide assembly (13), said attachment means being intended to support a said object during its movement alongs said path, in which arrangement there is an elongated carrier (4) moveably mounted on the stand (1), a first motor (5) to move said carrier with reciprocating movement along a first straight path, a second motor (14) for moving the slide assembly (13) on the elongated carrier (4)

with reciprocating movement along a second straight path, which is substantially perpendicular to the first path, said slide assembly carrying one end of a link system (21-27, 29-34) which includes a first link-arm (21), one end of which is attached to a drive shaft (20) in the slide assembly (13) and the other end of which is connected to the centre of a second link-arm (23) which is twice as long as the first link-arm (21) and the first end of which second link-arm (23) forms a free end (24) of the link system, which is reciprocatingly moveable along a third straight path which is perpendicular to both the first path and the second path and carries the attachment means (28), the second end of the second link-arm (23) being displaceably journalled for movement in a direction which is perpendicular to the third path and intersects the drive shaft (20) of the link system; and a third motor (35) which is carried by the slide assembly (13) and is drivingly connected to the drive shaft (20) to rotate the drive shaft (20) by aid of a gear (36) and a toothed belt (38) which runs over a drive pulley (37) on the gear (36) and a guide pulley (39) mounted on the drive shaft (20) and having a considerably larger diameter than the drive pulley (37).

2. An arrangement according to claim 1, characterized in that the first link-arm (21) and that part of the second link-arm (23) located between the centre (22) and the first end (24) each forms a part of a respective parallelogram-link system, said link systems being actually connected in a manner such as to move the attachment means (28) in a rectilinear path upon rotation of the drive shaft (20).

3. An arrangement according to claim 1, characterized by a counterbalancing arrangement (40, 41) connected between the elongated carrier (4) and the slide assembly (13) and functioning to balance the weight of the slide assembly (13).

4. An arrangement according to claim 1, characterized by a counterbalancing arrangement (42, 43, 45) connected between the slide assembly (13) and the link system (21-27, 29-34) and functioning to balance the torque exerted by the link system on the drive shaft (20).

5. An arrangement according to claim 3, characterized in that said counterbalancing arrangement comprises a gas spring (40) and a pressure assumulator (41).

6. An arrangement according to claim 4, characterized in that one end of the counterbalancing arrangement (42, 43, 45) is pivotally connected to the slide assembly (13) and the other end of said counterbalancing arrangement is pivotally connected to a pin (43) on the guide pulley (39).

7. An arrangement according to claim 4, characterized in that said counterbalancing arrangement comprises a gas spring (42) and a pressure accumulator (45).

* * * * *